(12) United States Patent
Satoshiro et al.

(10) Patent No.: US 12,508,758 B2
(45) Date of Patent: Dec. 30, 2025

(54) INJECTION MOLDING MACHINE AND METHOD OF CONTROLLING THE SAME

(71) Applicant: THE JAPAN STEEL WORKS, LTD., Tokyo (JP)

(72) Inventors: Atsushi Satoshiro, Tokyo (JP); Toshio Toyoshima, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 65 days.

(21) Appl. No.: 18/225,921

(22) Filed: Jul. 25, 2023

(65) Prior Publication Data

US 2024/0042663 A1 Feb. 8, 2024

(30) Foreign Application Priority Data

Aug. 3, 2022 (JP) ................................ 2022-124166

(51) Int. Cl.
*B29C 45/76* (2006.01)
*B29C 45/13* (2006.01)

(52) U.S. Cl.
CPC ............ *B29C 45/762* (2013.01); *B29C 45/13* (2013.01); *B29C 2945/76066* (2013.01); *B29C 2945/76498* (2013.01); *B29C 2945/76555* (2013.01); *B29C 2945/76678* (2013.01); *B29C 2945/76859* (2013.01); *B29C 2945/76973* (2013.01)

(58) Field of Classification Search
CPC .................. B29C 45/762; B29C 45/13; B29C 2945/76066; B29C 2945/76498; B29C 2945/76555; B29C 2945/76678; B29C 2945/76859; B29C 2945/76973; B29C 45/76; B29C 2945/76658; B29C 2945/76929; B22F 3/225
See application file for complete search history.

(56) References Cited

U.S. PATENT DOCUMENTS

2018/0022002 A1* 1/2018 Moss ..................... B29C 45/281
425/146
2023/0339162 A1* 10/2023 Aiba ....................... B29C 45/13

FOREIGN PATENT DOCUMENTS

JP 2002-066712 A 3/2002

* cited by examiner

*Primary Examiner* — S. Behrooz Ghorishi
(74) *Attorney, Agent, or Firm* — Potomac Law Group, PLLC

(57) ABSTRACT

Performance of an injection molding machine is improved. The injection molding machine includes: a central controller centrally controlling an injection molding operation; a first injection apparatus performing an injecting operation of material, based on a first injection start signal output from the central controller; a second injection apparatus performing an injecting operation of material, based on a second injection start signal output from the central controller; and a mold clamping apparatus performing a mold clamping apparatus. The injection molding machine is configured to adjust a time difference between a first injection start timing of the material injected from the first injection apparatus and a second injection start timing of the material injected from the second injection apparatus.

3 Claims, 7 Drawing Sheets

INJECTION MOLDING MACHINE AND METHOD OF CONTROLLING THE SAME

CROSS-REFERENCE TO RELATED APPLICATION

The present application claims priority from Japanese Patent Application No. 2022-124166 filed on Aug. 3, 2022, the content of which is hereby incorporated by reference into this application.

TECHNICAL FIELD OF THE INVENTION

The present invention relates to an injection molding machine and a method of controlling the same, and related to a technique effectively applied to, for example, an injection molding machine including a plurality of injection apparatuses and a method of controlling the same.

BACKGROUND OF THE INVENTION

Japanese Patent Laid-Open Application Publication No. 2002-66712 (Patent Document 1) describes a technique related to an injection molding machine using a metal material represented by magnesium, magnesium alloy, aluminum alloy or zinc alloy.

Related Art Document

Patent Document

Patent Document 1: Japanese Patent Laid-Open Application Publication No. 2002-66712

SUMMARY OF THE INVENTION

The injection molding machine is an apparatus that melts material with heat, and then flows the material into a mold to manufacture a molded article, and is an apparatus that can process a series of injection molding steps including material melting, inflow (injecting) of the material into a mold, cooling and taking out.

With regards to this, the injection molding machine is configured of, for example, an injection apparatus and a mold clamping apparatus. When a large sized molded article is manufactured, the amount of molten material injected from the injection apparatus also increases. This means leading to increase in a screw diameter of the injection apparatus and leading to increase in a size of a heater used for melting the material, and there are also limits to increase in the screw diameter and increase in the size of the heater. Furthermore, depending on the material, the molten material may solidify immediately after being injected. When a large sized molded article is manufactured, the molded article may not be manufactured as a result of the molten material being solidified before the injected molten material is spread across the entire mold.

Thus, in order to provide an injection molding machine capable of support even a case where a large sized molded article is manufactured or a case where a material that easily solidifies immediately is used, an injection molding machine in which a plurality of injection apparatuses are provided for one mold clamping apparatus has been studied. In such a case, the amount of molten material injected from the entire plurality of injection apparatuses can be increased without increasing the respective screw diameter of the plurality of injection apparatuses and the size of the heater, and thus, this case is advantageous in that the large sized molded article is easily manufactured. Furthermore, even when the material that immediately solidifies after the molten material is injected is used, it is considered that the injected molten material can be suppressed from solidifying before the molten material spreads across the entire mold since the molten material is injected from the plurality of injection apparatuses.

Therefore, from the standpoint of providing the injection molding machine capable of support even the case where the large sized molded article is manufactured or the case where the material that tends to immediately solidify is used, an injection molding machine (hereinafter sometimes referred to as "multi-injection molding machine") in which a plurality of injection apparatuses are provided for one mold clamping apparatus is usable. However, as a result of the inventor's studies of the present invention, it became apparent that the "multi-injection molding machine" has room for improvement specific to the "multi-injection molding machine". Thus, devisal to overcome the room for improvement existing in the "multi-injection molding machine" is desired.

An injection molding machine according to one embodiment includes: a central controller centrally controlling an injection molding operation; a first injection apparatus performing an injecting operation of material, based on a first injection start signal for the first injection apparatus output from the central controller; a second injection apparatus performing an injecting operation of material, based on a second injection start signal for the second injection apparatus output from the central controller; and a mold clamping apparatus performing a mold clamping operation. Here, the injection molding machine is configured to adjust a time difference between a first injection start timing of the material injected from the first injection apparatus and a second injection start timing of the material injected from the second injection apparatus.

A method of controlling an injection molding machine according to one embodiment includes a step of adjusting a time difference between a first injection start timing of a material injected from a first injection apparatus performing an injecting operation of the material based on a first injection start signal for the first injection apparatus output from a central controller centrally controlling an injection molding operation, and a second injection start timing of a material injected from the second injection apparatus performing an injecting operation of the material based on a second injection start signal for the second injection apparatus output from the central controller.

According to one embodiment, performance of a "multi-injection molding machine" can be improved.

BRIEF DESCRIPTIONS OF THE DRAWINGS

DESCRIPTIONS OF THE PREFERRED EMBODIMENTS

The same components are denoted by the same reference signs throughout all the drawings for describing the embodiments, and the repetitive description thereof will be omitted. Note that hatching is used even in a plan view so as to make the drawings easy to see.

<Configuration of "Twin Injection Molding Machine">

The technical idea in the present embodiment can be widely applied to a "multi-injection molding machine" in which a plurality of injection apparatuses are provided for one mold clamping apparatus. With regards to this, hereinafter, the technical idea in the present embodiment will be explained with exemplification of a "twin injection molding machine" in which two injection apparatuses are provided for one mold clamping apparatus of the "multi-injection molding machine".

<Outline of "Twin Injection Molding Machine">

Figure 1:
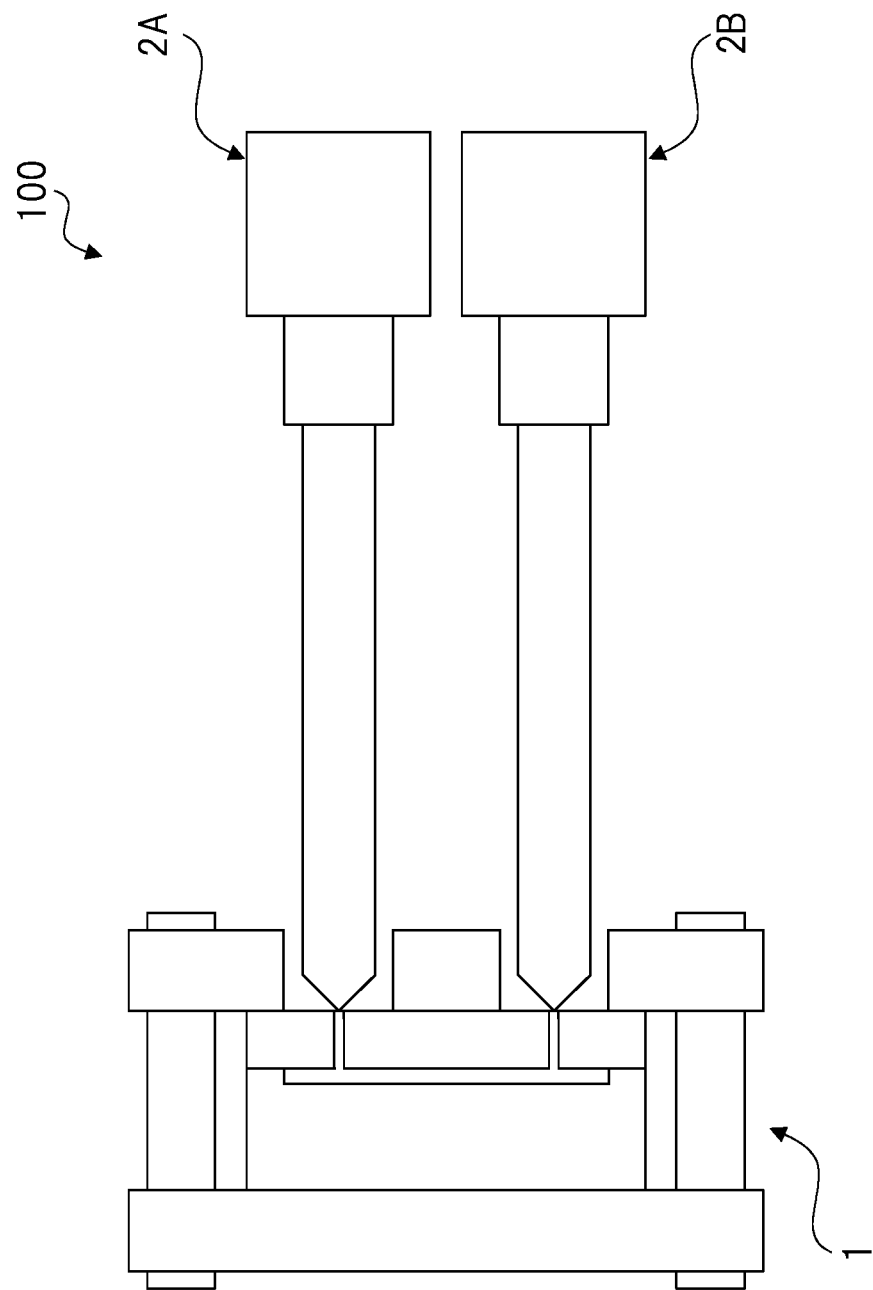
FIG. 1 is a plan view illustrating a schematic configuration of a "twin injection molding machine"

FIG. 1 is a plan view illustrating a schematic configuration of a "twin injection molding machine 100".

In FIG. 1, the "twin injection molding machine 100" includes one mold clamping apparatus 1, an injection apparatus 2A and an injection apparatus 2B. Here, the mold clamping apparatus 1 is an apparatus performing a mold clamping operation. For example, the mold clamping apparatus 1 is configured such that a die into which the material injected from the injection apparatus 2A and the material injected from the injection apparatus 2B are flowed can be attached to the mold clamping apparatus, and is an apparatus manufacturing a molded article by flowing the material into a cavity (closed space) formed by performing the mold clamping operation on the die. Meanwhile, each of the injection apparatus 2A and the injection apparatus 2B is an apparatus performing the injecting operation, and is an apparatus, for example, kneading and melting the material and injecting the kneaded and molten material into the cavity formed in the mold clamping apparatus 1.

<<Configuration of Mold Clamping Apparatus>>

Figure 2:
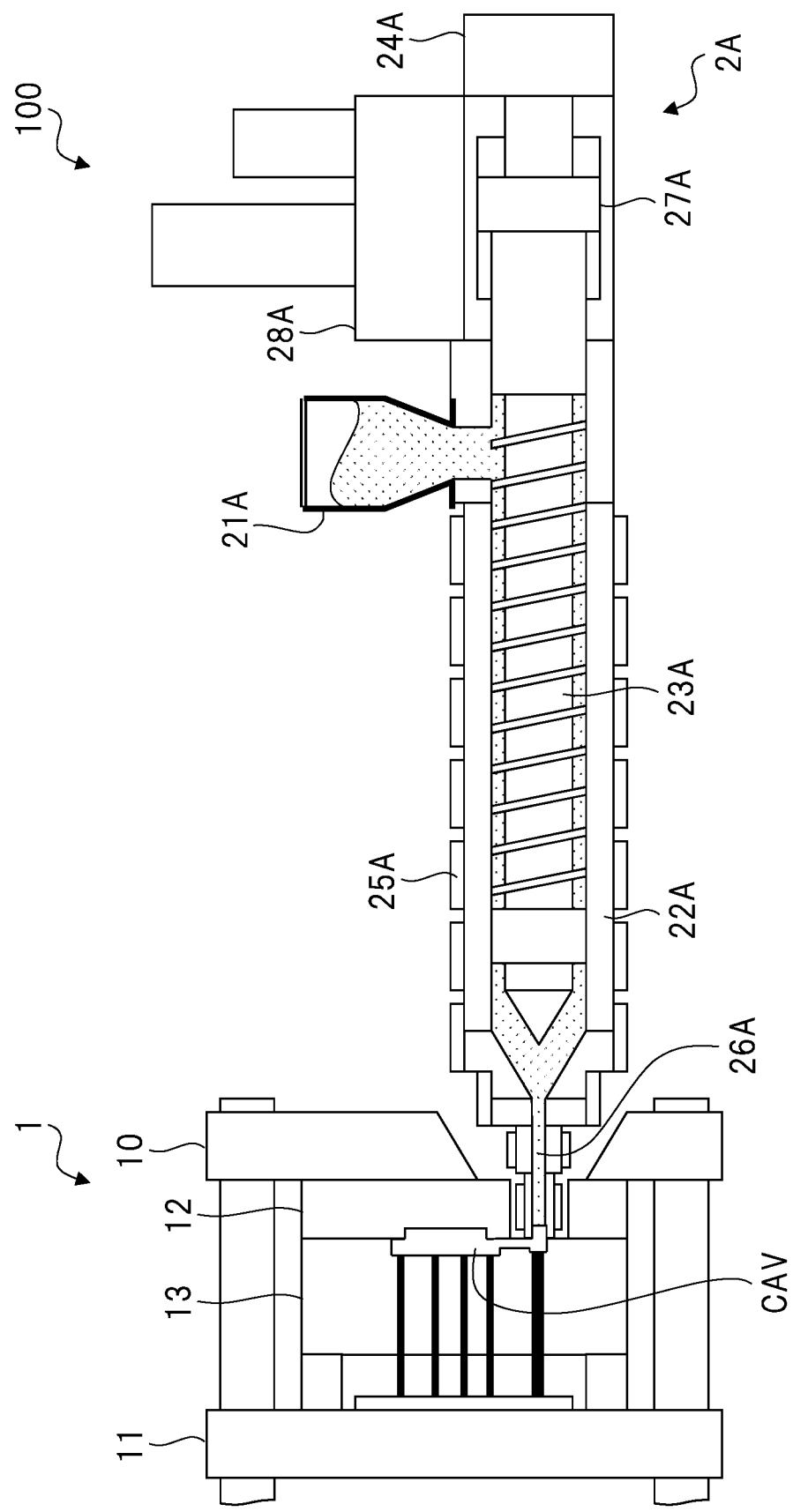
FIG. 2 is a partial cross-sectional view illustrating a schematic configuration of the "twin injection molding machine"

FIG. 2 is a partial cross-sectional view illustrating a schematic configuration of the "twin injection molding machine 100".

Although the "twin injection molding machine 100" includes the injection apparatus 2A and the injection apparatus 2B as illustrated in FIG. 1, only one injection apparatus 2A will be illustrated and described in FIG. 2 since the injection apparatus 2A and the injection apparatus 2B have similar configurations.

The mold clamping apparatus 1 includes a movable board 10 that is movable and a fixed board 11 that is fixed, and is configured such that a distance between the movable board 10 and the fixed board 11 can be variably controlled. A movable mold (die) 12 and a fixed mold (die) 13 can be arranged between the movable board 10 and the fixed board 11. Thus, for example, since the distance between the movable board 10 and the fixed board 11 can be variably controlled by the mold clamping apparatus 1, the distance between the movable mold 12 and the fixed mold 13 can be made close to each other to cause a "mold closed" state, and the distance between the movable mold 12 and the fixed mold 13 can be made far away from each other to cause a "mold open" state. At this time, when the relation between the movable mold 12 and the fixed mold 13 is in the "mold closed" state, the closed space (cavity) CAV is formed between the movable mold 12 and the fixed mold 13, and the molded article is formed by flowing the material into the closed space CAV. In particular, in the "twin injection molding machine 100" illustrated in FIG. 2, when the relation between the movable mold 12 and the fixed mold 13 is in the "mold closed" state, one closed space CAV is formed, and the molded article is formed by flowing the material into the closed space CAV. The mold clamping apparatus 1 is configured as described above.

<<Configuration of Injection Apparatus>>

Next, as illustrated in FIG. 2, the injection apparatus 2A that pushes out the material is connected to the mold clamping apparatus 1, and the material pushed out from the injection apparatus 2A is flowed into the closed space CAV formed by the "mold closing" state between the movable mold 12 and the fixed mold 13.

The injection apparatus 2 includes a hopper 21A for introduction of the material (raw material) and a cylinder 22A. When the material is introduced into the hopper 21A, the material is kneaded by a rotatable screw 23A arranged inside the cylinder 22A. Specifically, the screw 23A is connected to a screw rotating motor 24A, and the screw 23A is rotated by driving the screw rotating motor 24A.

At this time, a heater 25A is arranged around the cylinder 22A, and the material introduced into the cylinder 22A is kneaded to become the molten material by the screw 23A while being heated by the heater 25A. A nozzle 26A is provided at the distal end of the cylinder 22A. Furthermore, a piston 27A is connected to the screw 23A, and the forward moving operation and the backward moving operation of the piston 27A are controlled by an oil hydraulic apparatus 28A. Thus, for example, when the piston 27A is controlled to move forward by the oil hydraulic apparatus 28A, the screw 23A connected to the piston 27A moves forward, and as a result, the molten material pushed out by the forward moving screw 23A is injected from the nozzle 26A. The injection apparatus 2A is configured as described above.

<<Operation of "Twin Injection Molding Machine">>

The "twin injection molding machine 100" is configured as described above, and the operation thereof will be briefly described below. In FIG. 2, when the material is introduced into the hopper 21A, the material is kneaded by the rotatable screw 23A arranged inside the cylinder 22A while being heated by the heater 25A to become the molten material. Then, by the oil hydraulic apparatus 28A, the piston 27A is controlled to move forward. As a result, the screw 23A connected to the piston 27A moves forward, and the molten material pushed out by the forward moving screw 23A is injected from the nozzle 26A toward the mold clamping apparatus 1. Thus, the material is filled in the closed space CAV formed between the movable mold 12 and the fixed mold 13 to form the molded article.

In the "twin injection molding machine 100", note that not only the injection apparatus 2A but the injection apparatus 2B also performs the injecting operation similar to the injecting operation described above. As a result, in the "twin injection molding machine 100", the amount of the molten material injected from the entire injection apparatus including combination of the injection apparatus 2A and the injection apparatus 2B can be increased without increasing the respective screw diameter of the injection apparatus 2A and the injection apparatus 2B or the size of the heater, and thus, the machine is advantageous in that a large sized molded article can be easily manufactured. Furthermore, since the molten material is injected from the injection apparatus 2A and the injection apparatus 2B, the machine is advantageous in that the molten material can be suppressed from solidifying before the injected molten material is spread across the entire closed space CAV even if the material that immediately solidifies after the molten material is injected is used.

<<Configuration of Oil Hydraulic Apparatus>>

Next, a configuration of the oil hydraulic apparatus 28A will be described.

Figure 3:
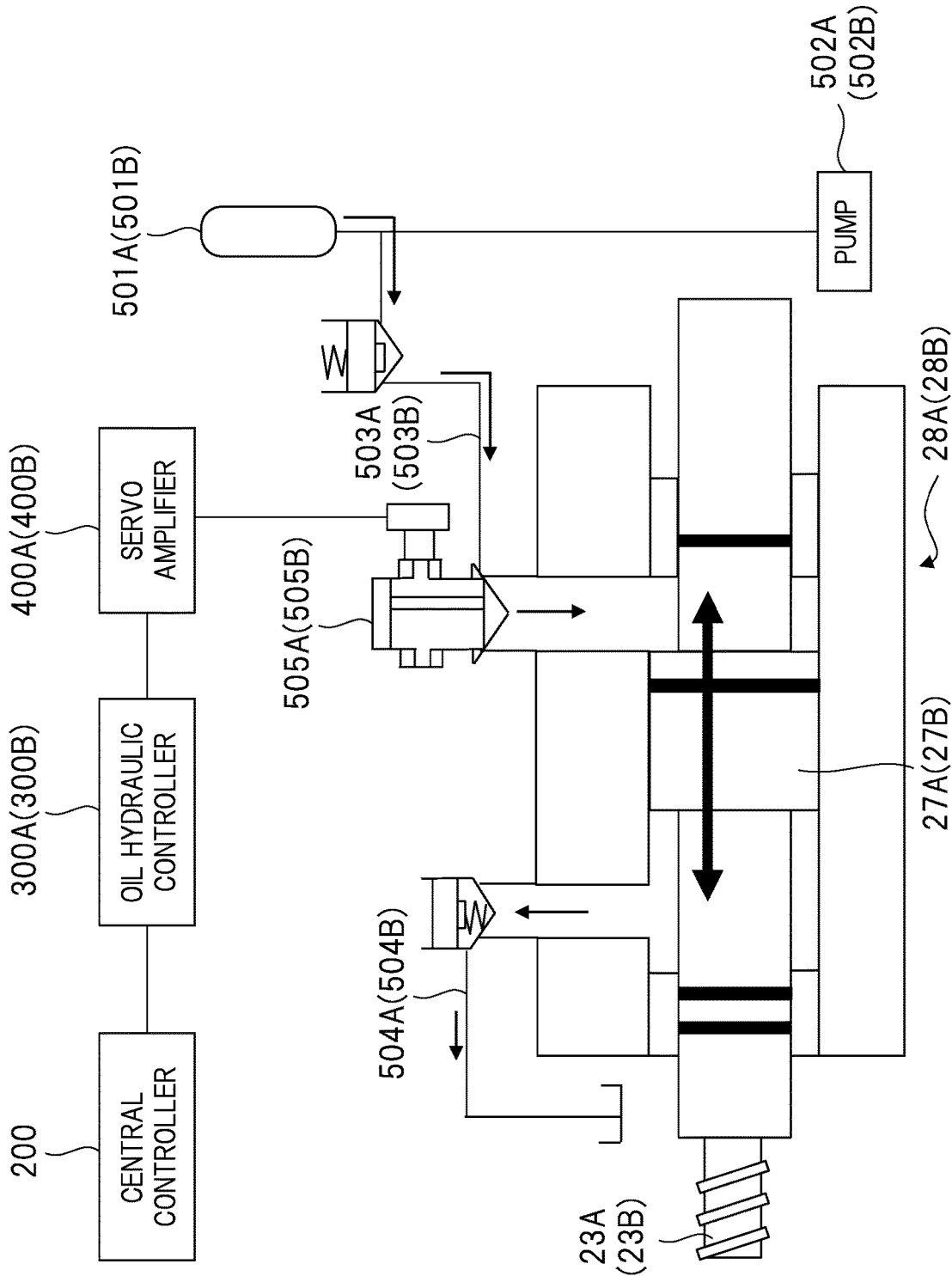
FIG. 3 is a diagram illustrating a configuration of an oil hydraulic control system including an oil hydraulic apparatus.

FIG. 3 is a diagram illustrating a configuration of an oil hydraulic control system including the oil hydraulic apparatus 28A.

In FIG. 3, the oil hydraulic apparatus 28A is configured to move the piston 27A connected to the screw 23A in the forward moving direction. In other words, the oil hydraulic apparatus 28A is an apparatus moving the screw 23A connected to the piston 27A forward by moving the piston 27A using oil pressure, and injecting the molten material pushed out by the forward moving screw 23A from the nozzle toward the mold clamping apparatus.

The oil hydraulic apparatus 28A having such a function includes an accumulator 501A for accumulating oil; a pump 502A for inflow of the oil into the accumulator 501A; a flow path 503A for moving the piston 27A by flowing the oil from the accumulator 501A; a flow path 504 for flow of the oil pushed out from the piston 27A; and a servo valve 505A provided on the flow path 503A. The oil hydraulic apparatus 28A configured as above adjusts the oil pressure for moving the piston 27A by adjusting the opening degree of the servo valve 505A. That is, the oil pressure to be applied on the piston 27A is adjusted to move the piston 27A forward by the adjustment of the opening degree of the servo valve 505A.

Here, the injection speed at the time of the injection of the molten material pushed out by the screw 23A connected to the forward moving piston 27A from the nozzle toward the mold clamping apparatus is determined by the flow rate of the oil flowing from the accumulator 501A to the piston 27A through the flow path 503A. The servo valve 505A has a role of adjusting the flow rate of the oil flowing through the flow path 503A. In other words, the flow rate of the flowing oil is adjusted to determine the injection speed by controlling the opening degree of the servo valve 505A. Thus, the opening degree of the servo valve 505A is controlled to control the injection speed.

Hereinafter, a configuration for adjusting the opening degree of the servo valve 505A will be described.

In FIG. 3, a central controller 200 has a function of centrally controlling the injection molding operation performed by the injection molding machine, and is configured to, for example, output an injection start signal to an oil hydraulic controller 300A at the time of start of the injecting operation.

The oil hydraulic controller 300A is configured to receive, as its input, an injection start signal output from the central controller 200, and is configured to output a command signal to the servo amplifier 400A when the injection start signal output from the central controller 200 is input. Specifically, the command signal is a signal indicating a target value at which a state of the opening degree of the servo valve 505A is determined.

The servo amplifier 400A is configured to receive, as its input, the command signal output from the oil hydraulic controller 300A, and is configured to supply output (power) for achieving the opening degree of the target value indicated by the command signal to the servo valve 505A when the command signal output from the oil hydraulic controller 300A is input. Then, the servo valve 505A is configured to change the opening degree, based on the power output from the servo amplifier 400A.

Practically, the opening degree of the servo valve 505A is detected at this stage, and the detection signal is fed back to the servo amplifier 400A. Then, the servo amplifier 400A is configured to compare the target value indicated by the command signal input from the oil hydraulic controller 300A and the fed back detection signal, and perform feedback control so that its difference approaches zero.

<<Operation of Oil Hydraulic Apparatus>>

Next, the operation of the oil hydraulic control system including the oil hydraulic apparatus 28A will be described.

In FIG. 3, when the central controller 200 centrally controlling the injection molding operation performed by the injection molding machine determines to start the injecting operation, the central controller 200 outputs an injection start signal to the oil hydraulic controller 300A. Then, when the injection start signal output from the central controller 200 is input, the oil hydraulic controller 300A outputs a command signal to the servo amplifier 400A.

Subsequently, when the command signal output from the oil hydraulic controller 300A is input, the servo amplifier 400A supplies output (power) for achieving the opening degree of the target value indicated by the command signal to the servo valve 505A. As a result, the opening degree of the servo valve 505A changes based on the power output from the servo amplifier 400A.

Here, in the oil hydraulic control system, the opening degree of the servo valve 505A is detected, and the detection signal is fed back to the servo amplifier 400A. The servo amplifier 400A then compares the target value indicated by the command signal input from the oil hydraulic controller 300A and the fed back detection signal, and performs feedback control such that its difference approaches zero.

As described above, the servo valve 505A is controlled to take the opening degree of the target value indicated by the command signal output from the oil hydraulic controller 300A.

Thus, as a result of the control of the opening degree of the servo valve 505A, the flow rate of the flowing oil is adjusted, and the oil pressure for moving the piston 27A is controlled. That is, for example, when the opening degree of the servo valve 505A is controlled to increase the oil pressure applied to the piston 27A, the piston 27A moves forward. As a result, the screw 23A connected to the piston 27A moves forward, and the molten material is injected from the nozzle to the mold clamping apparatus by the forward moving screw 23A. The oil hydraulic control system operates as described above.

<Distributed Control System>

The "twin injection molding machine 100" having the configuration described above adopts a distributed control system, and thus the distributed control system will be described below.

Figure 4:
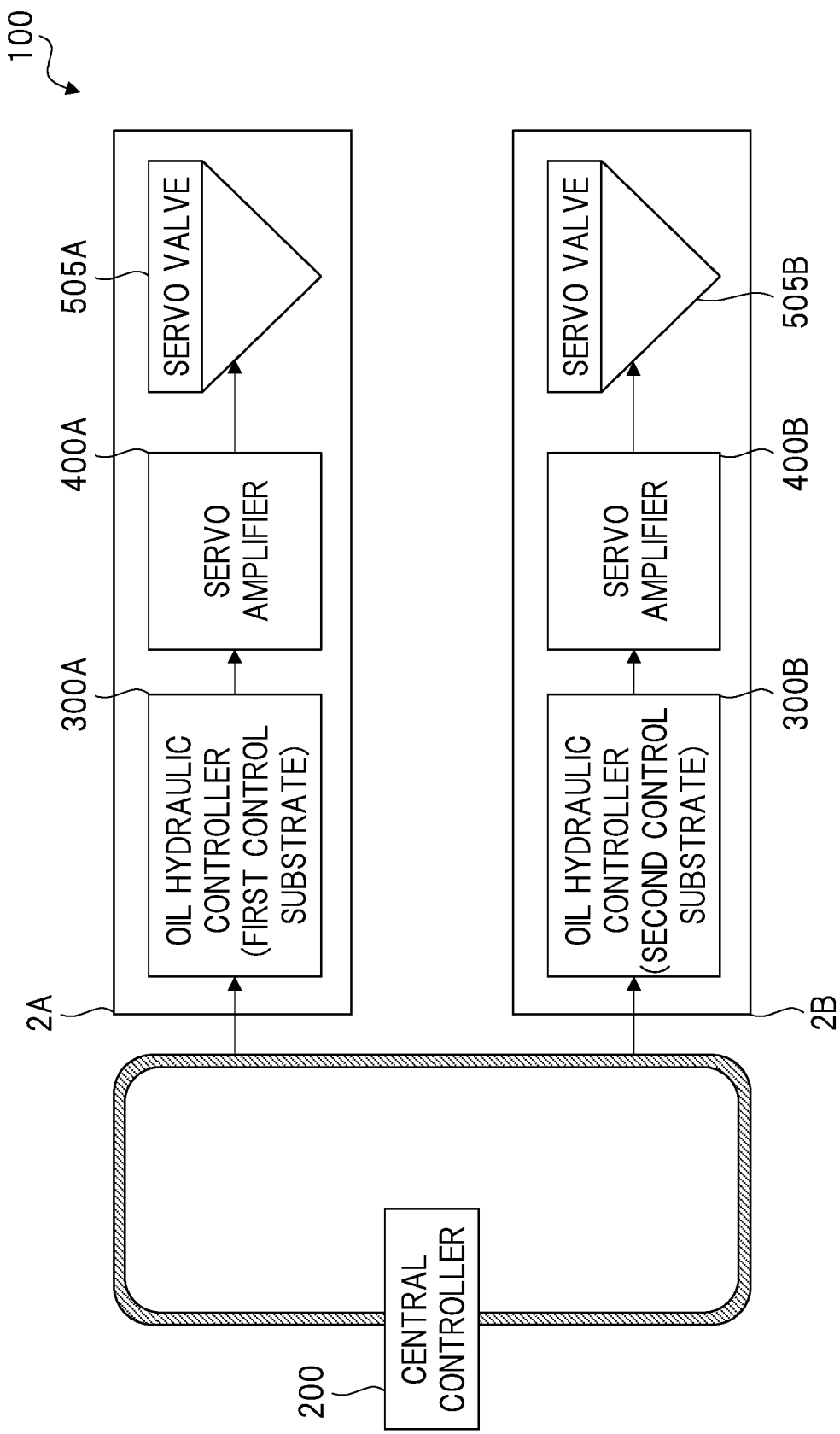
FIG. 4 is a functional block diagram illustrating a configuration of a distributed control system.

FIG. 4 is a functional block diagram illustrating a configuration of the distributed control system.

In FIG. 4, the distributed control system includes the central controller 200, the injection apparatus 2A and the injection apparatus 2B. The central controller 200 and the injection apparatus 2A are connected by communication, and the central controller 200 and the injection apparatus 2B are also connected by communication.

The injection apparatus 2A includes the oil hydraulic controller 300A, the servo amplifier 400A, and the servo valve 505A described above. Similarly, the injection apparatus 2B includes the oil hydraulic controller 300B, the servo amplifier 400B, and the servo valve 505B.

In the "twin injection molding machine 100" including the distributed control system configured as above, the central controller 200 controls each of the injection apparatus 2A and the injection apparatus 2B through communication. Specifically, a "first injection start signal" output from the central controller 200 is input to the oil hydraulic controller 300A of the injection apparatus 2A through communication. The oil hydraulic controller 300A receiving, as its input, the "first injection start signal", outputs a "first command signal" to the servo amplifier 400A. Then, the "first command signal" output from the oil hydraulic controller 300A is input to the servo amplifier 400A. The servo amplifier 400A then supplies output for achieving the opening degree of the target value indicated by the "first command signal" to the servo valve 505A. As a result, the opening degree of the servo valve 505A changes based on the power output from the servo amplifier 400A.

Then, in explanation with reference to FIG. 3, the flow rate of the flowing oil is adjusted as a result of the change of the opening degree of the servo valve 505A, and the oil pressure for moving the piston 27A is controlled. That is, for example, when the opening degree of the servo valve 505A is controlled to increase the oil pressure applied to the piston 27A, the piston 27A moves forward. As a result, the screw 23A connected to the piston 27A moves forward, and the molten material is injected from the nozzle toward the mold clamping apparatus by the forward moving screw 23A. The injection apparatus 2A operates as described above.

Similarly, the "second injection start signal" output from the central controller 200 is also input to the oil hydraulic controller 300B of the injection apparatus 2B through communication. The oil hydraulic controller 300B receiving, as its input, the "second injection start signal" outputs a "second command signal" to the servo amplifier 400B. Then, the "second command signal" output from the oil hydraulic controller 300B is input to the servo amplifier 400B. The servo amplifier 400B supplies output for achieving the opening degree of the target value indicated by the "second command signal" to the servo valve 505B. As a result, the opening degree of the servo valve 505B changes based on the power output from the servo amplifier 400A.

Then, in explanation with reference to FIG. 3, the flow rate of the flowing oil is adjusted as a result of the change of the opening degree of the servo valve 505B, and the oil pressure for moving the piston 27B is controlled. That is, for example, when the opening degree of the servo valve 505B is controlled to increase the oil pressure applied to the piston 27B, the piston 27B moves forward. As a result, the screw 23B connected to the piston 27B moves forward, and the molten material is injected from the nozzle toward the mold clamping apparatus by the forward moving screw 23B. The injection apparatus 2B operates as described above.

In such a distributed control system, a control substrate (sometimes referred to as "first control substrate") that configures the oil hydraulic controller 300A, and a control substrate (sometimes referred to as "second control substrate") that configures the oil hydraulic controller 300B are separate bodies. The reasons for this will be described below.

In other words, each of the injection apparatus 2A and the injection apparatus 2B is provided with various instruments such as a limit switch, a sensor, or a valve. In order to reduce the wiring length of each instrument and control substrate, the "first control substrate" and the "second control substrate" are formed as separate bodies.

Specifically, in the "twin injection molding machine 100", instruments are arranged all over the machine. When all the wirings connected to the instruments are collectively connected to one control substrate, the wiring length becomes long. On the other hand, for example, when the control substrates are distributed on the mold clamping apparatus side, the instrument arranged on the mold clamping apparatus side can be connected to the control substrate. Thus, the wiring length can be shortened.

Because of such a reason, the machine adopts the distributed control system not controlling both the injection apparatus 2A and the injection apparatus 2B by one control substate, but independently controlling the injection apparatus 2A and the injection apparatus 2B by the respective control substrates that are the separate bodies for controlling the injection apparatus 2A and the injection apparatus 2B. Such distributed control system is advantageous in that the length of the wiring for connecting the instrument and the control substrate can be shortened.

However, from the inventor's studies of the present invention, it has been revealed that the "twin injection molding machine 100" configured from the distributed control system having the above advantages has room for improvement specific to the distributed control system. In other words, the inventors of the present invention have revealed that the configuration of the "twin injection molding machine 100" from the distributed control system has room for improvement specific to the distributed control system, and thus the room for improvement will be described below.

<Room for Improvement>

For example, as illustrated in FIG. 4, in the distributed control system, the "first injection start signal" output from the central controller 200 is transmitted to the oil hydraulic controller 300A of the injection apparatus 2A through communication, and the "second injection start signal" output from the central controller 200 is also transmitted to the oil hydraulic controller 300B of the injection apparatus 2B through communication. Here, the "first distance" between the central controller 200 and the oil hydraulic controller 300A of the injection apparatus 2A and the "second distance" between the central controller 200 and the oil hydraulic controller 300B of the injection apparatus 2B are different from each other. As a result, arrival time of the "first injection start signal" to the oil hydraulic controller 300A of the injection apparatus 2A and arrival time of the "second injection start signal" to the oil hydraulic controller 300B of the injection apparatus 2B are different from each other. This means that the injection start timing in the injection apparatus 2A and the injection start timing in the injection apparatus 2B are shifted from each other. Thus, the material filling state may be unbalanced in the closed space (cavity) of the mold clamping apparatus that is the injecting destination of the material. The unbalanced material filling state fails to manufacture a normal molded article.

Thus, in the "twin injection molding machine 100" adopting the distributed control system, the room for improvement in the unbalanced material filling state in the closed space of the mold clamping apparatus has been revealed, the unbalanced material filling state being caused as a result of the unintentional shift between the injection start timing in the injection apparatus 2A and the injection start timing in the injection apparatus 2B due to a factor (1) in which the "first control substrate" configuring the oil hydraulic controller 300A of the injection apparatus 2A and the "second control substrate" configuring the oil hydraulic controller 300B of the injection apparatus 2B are independent separate components and a factor (2) in which the central controller 200 and each of the injection apparatus 2A and the injection apparatus 2B are connected through communication.

In particular, for example, in the "twin injection molding machine 100" using magnesium alloy for the material, when the injection time is short to be a few tens of ms, if the injection start timing in the injection apparatus 2A and the injection start timing in the injection apparatus 2B are undesirably shifted by a few of ms, the room for improvement that is the unbalanced material filling state in the closed space of the mold clamping apparatus is revealed.

Therefore, in the present embodiment, devisal for overcoming the room for improvement specific to the "twin injection molding machine 100" adopting the distributed control system described above has been made. The technical idea in the present embodiment with such a devisal will be described below.

<Basic Idea of Embodiment>

The basic idea in the present embodiment is an idea of making a devisal not clearly causing the "unintentional shift" between the first injection start timing of the molten material from the first injection apparatus and the second injection start timing of the molten material from the second injection apparatus". According to this basic idea, the "unintentional shift" between the first injection start timing in the first injection apparatus and the second injection start timing in the second injection apparatus can be suppressed. As a result, according to the basic idea, the unbalanced material filling state in the closed space of the mold clamping apparatus be suppressed.

Specifically, the devisal not clearly causing the "unintentional shift" is a devisal for intentionally adjusting the time difference between the first injection start timing of the molten material from the first injection apparatus and the second injection start timing of the molten material from the second injection apparatus so as not to clearly cause the "unintentional shift".

According to such a devisal, the unbalanced material filling state in the closed space of the mold clamping apparatus can be suppressed. This is because the intentional adjustment of the time difference between the first injection start timing in the first injection apparatus and the second injection start timing in the second injection apparatus means enabling the time difference between the first injection start timing in the first injection apparatus and the second injection start timing in the second injection apparatus to be adjusted to suppress the unbalanced material filling state in the closed space of the mold clamping apparatus.

In other words, the basic idea is an idea of, if the unbalanced material filling state is caused in the closed space of the mold clamping apparatus by the "unintentional shift", suppressing the unbalanced material filling state by the intentional timing adjustment of suppressing the unbalanced material filling state in the closed space of the mold clamping apparatuses so as not to clearly cause the "unintentional shift".

Embodied modes for embodying the basic idea include, for example, a first embodied mode and a second embodied mode as described below, and each of the embodies modes will be described.

<First Embodied Mode (Synchronization)>

A first embodied mode embodying the basic idea is a mode for synchronizing the first injection start timing of the material from the first injection apparatus and the second injection start timing of the material from the second injection apparatus.

That is, in the first embodied mode, the devisal (basic idea) of intentionally adjusting the time difference between the first injection start timing of the molten material from the first injection apparatus and the second injection start timing of the molten material from the second injection apparatus is embodied by a configuration of synchronizing the first injection start timing and the second injection start timing so as not clearly cause the "unintentional shift" described above. In other words, in the first embodied mode, the basic idea is embodied by a configuration of adjusting the time difference between the first injection start timing and the second injection start timing to zero.

<<Configuration of Distributed Control System>>

Figure 5:
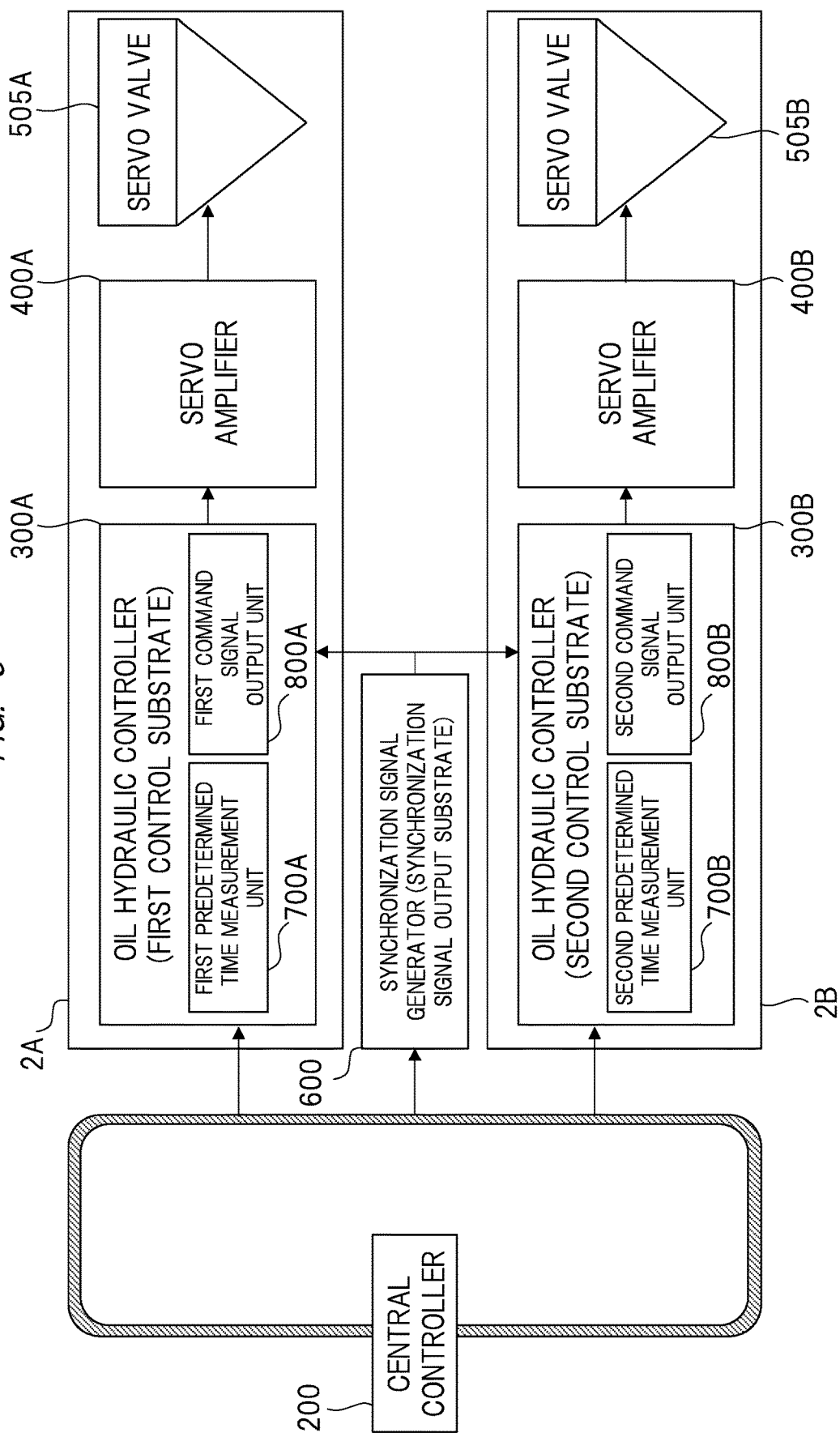
FIG. 5 is a functional block diagram illustrating a configuration of a distributed control system of a first embodied mode.

FIG. 5 is a functional block diagram illustrating a configuration of the distributed control system in the first embodied mode.

In FIG. 5, the distributed control system in the first embodied mode includes the central controller 200, a synchronization signal generator 600, the injection apparatus 2A and the injection apparatus 2B, and the central controller 200 and the synchronization signal generator 600 are connected through communication. Furthermore, the central controller 200 and the injection apparatus 2A are connected through communication, and the central controller 200 and the injection apparatus 2B are also connected through communication. Specifically, the central controller 200 is configured to output the "first injection start signal" for the injection apparatus 2A to the injection apparatus 2A, and the "first injection start signal" is output to the injection apparatus 2A through the communication. Similarly, the central controller 200 is configured to output the "second injection start signal" for the injection apparatus 2B to the injection apparatus 2B, and the "second injection start signal" is output to the injection apparatus 2A through the communication. Furthermore, the central controller 200 is configured to output a "synchronization signal generation command" to the synchronization signal generator 600, and the "synchronization signal generation command" is output to the synchronization signal generator 600 through the communication.

The synchronization signal generator 600 is configured to generate a "synchronization signal" when receiving the "synchronization signal generation command" as its input output from the central controller 200. The synchronization signal generator 600 is configured to simultaneously output the generated "synchronization signal" to each of the injection apparatus 2A and the injection apparatus 2B. The injection apparatus 2A includes an oil hydraulic controller 300A, a servo amplifier 400A, and a servo valve 505A. Similarly, the injection apparatus 2B includes an oil hydraulic controller 300B, a servo amplifier 400B, and a servo valve 505B.

The oil hydraulic controller 300A is configured to include a first predetermined time measurement unit 700A and a first command signal output unit 800A, and is configured to receive, as its input, the "synchronization signal" generated by the synchronization signal generator 600. At this time, the first predetermined time measurement unit 700A is configured to start measurement of a present first predetermined time by using, for example, a timer or the like when the "synchronization signal" is input to the oil hydraulic controller 300A. The first command signal output unit 800A is configured to output the "first command signal" to the servo amplifier 400A when the measurement of the first predetermined time in the first predetermined time measurement unit 700A is terminated.

Similarly, the oil hydraulic controller 300B is configured to include a second predetermined time measurement unit 700B and a second command signal output unit 800B, and is configured to receive, as its input, the "synchronization signal" generated by the synchronization signal generator 600. At this time, the second predetermined time measurement unit 700B is configured to start measurement of a present second predetermined time by using, for example, a timer or the like when the "synchronization signal" is input to the oil hydraulic controller 300B. The second command signal output unit 800B is configured to output the "second command signal" to the servo amplifier 400B when the measurement of the second predetermined time in the second predetermined time measurement unit 700B is terminated.

In other words, in the distributed control system of the first embodied mode, the oil hydraulic controller 300A is not configured to output the "first command signal" to the servo amplifier 400A by only the input of the "first injection start signal" output from the central controller 200, and is configured to output the "first command signal" to the servo amplifier 400A for the first time after elapse of the first predetermined time from the additional input of the "synchronization signal" generated by the synchronization signal generator 600.

Similarly, the oil hydraulic controller 300B is not configured to output the "second command signal" to the servo amplifier 400B by only the input of the "B injection start signal" output from the central controller 200, and is configured to output the "B command signal" to the servo amplifier 400B for the first time after elapse of the second predetermined time from the additional input of the "synchronization signal" generated by the synchronization signal generator 600.

<<Operation of Distributed Control System>>

Figure 6:
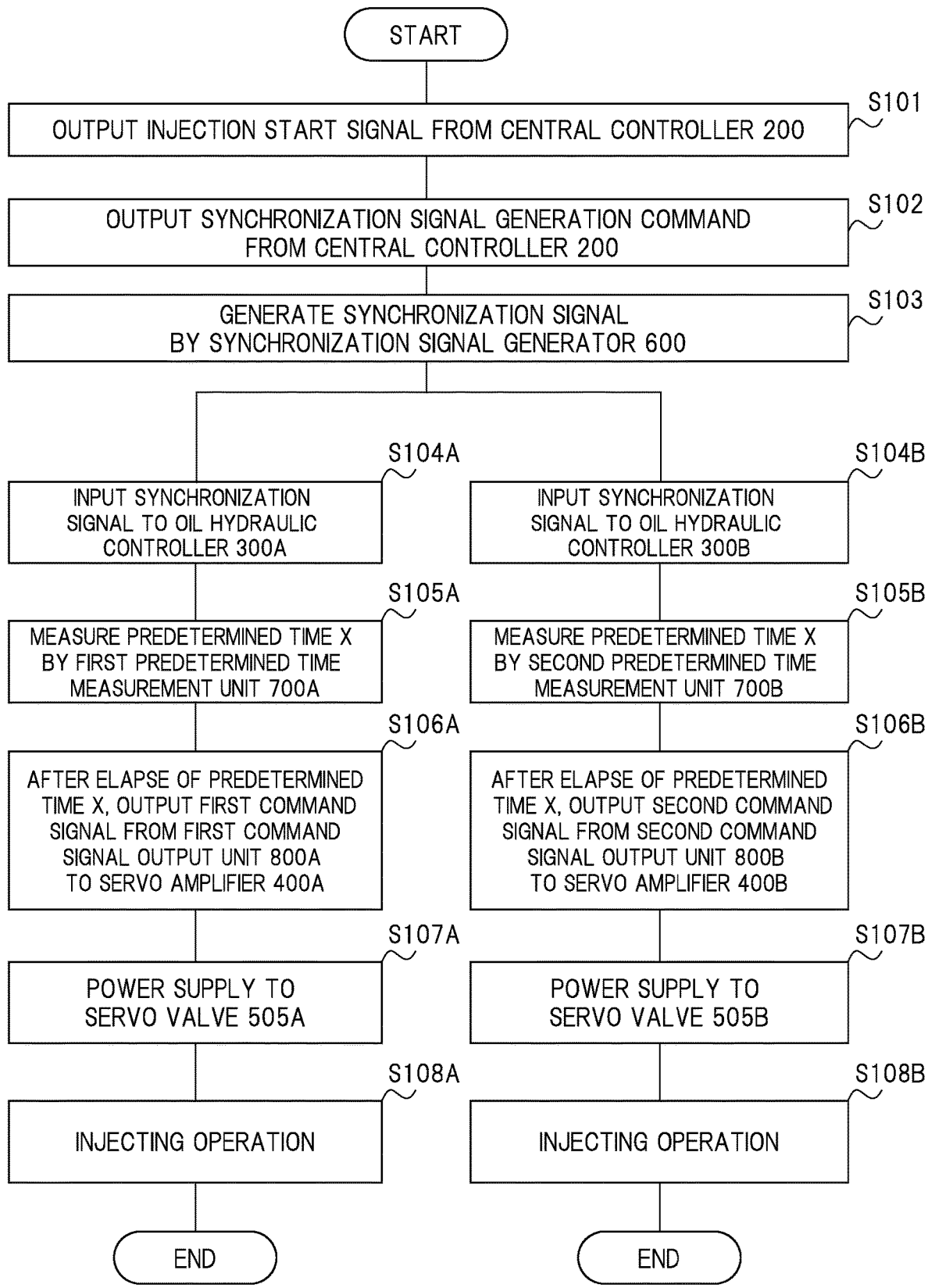
FIG. 6 is a flowchart describing the operation of the first embodied mode.

FIG. 6 is a flowchart describing the operation of the distributed control system in the first embodied mode, and the operation of the distributed control system will be described with reference to FIGS. 5 and 6.

First, the central controller 200 outputs the "first injection start signal" to the oil hydraulic controller 300A of the injection apparatus 2A and outputs the "second injection start signal" to the oil hydraulic controller 300B of the injection apparatus 2B through communication (S101). Then, the "first injection start signal" output from the central controller 200 is input to the oil hydraulic controller 300A of the injection apparatus 2A, and the "second injection start signal" output from the central controller 200 is input to the oil hydraulic controller 300B of the injection apparatus 2B.

Here, even if the "first injection start signal" is input, the oil hydraulic controller 300A waits without immediately outputting the "first command signal" to the servo amplifier 400A. Similarly, even if the "second injection start signal" is input, the oil hydraulic controller 300B waits without immediately outputting the "second command signal" to the servo amplifier 400B.

Furthermore, the central controller 200 outputs the "synchronization signal generation command" to the synchronization signal generator 600 through the communication (S102). The synchronization signal generator 600 then generates the "synchronization signal" based on the "synchronization signal generation command" output from the central controller 200 (S103). Then, the "synchronization signal" generated by the synchronization signal generator 600 is input to the oil hydraulic controller 300A and the oil hydraulic controller 300B, respectively (S104A, S104B).

When the "synchronization signal" is input to the oil hydraulic controller 300A, the first predetermined time measurement unit 700A starts to measure the preset predetermined time X (here, first predetermined time=second predetermined time=predetermined time X) (S105A). When the measurement of the predetermined time X by the first predetermined time measurement unit 700A is terminated, the first command signal output unit 800A outputs the "first command signal" to the servo amplifier 400A (S106A).

Similarly, when the "synchronization signal" is input to the oil hydraulic controller 300B, the second predetermined time measurement unit 700B starts to measure the preset predetermined time X (S105B). When the measurement of the predetermined time X by the second predetermined time measurement unit 700B is terminated, the second command signal output unit 800B outputs the "second command signal" to the servo amplifier 400B (S106B).

Therefore, the oil hydraulic controller 300A simply waits and does not output the "first command signal" to the servo amplifier 400A when receiving the input of the "first injection start signal" output from the central controller 200, but outputs the "first command signal" to the servo amplifier 400A for the first time after elapse of the predetermined time X from the additional input of the "synchronization signal" generated by the synchronization signal generator 600.

Similarly, the oil hydraulic controller 300B simply waits and does not output the "second command signal" to the servo amplifier 400B when receiving the input of the "second injection start signal" output from the central controller 200, but outputs the "second command signal" to the servo amplifier 400B for the first time after elapse of the predetermined time X from the additional input of the "synchronization signal" generated by the synchronization signal generator 600.

The injecting operation is started by the injection apparatus 2A and the injection apparatus 2B as described above.

Specifically, the "first command signal" output from the first command signal output unit 800A of the oil hydraulic controller 300A is input to the servo amplifier 400A. The servo amplifier 400A then supplies the output for achieving the opening degree of the target value indicated by the "first command signal" to the servo valve 505A (S107A). As a result, the opening degree of the servo valve 505A changes based on the power output from the servo amplifier 400A.

Then, the flow rate of the flowing oil is adjusted as a result of the change in the opening degree of the servo valve 505A, and the oil pressure for moving the piston 27A is controlled. That is, for example, when the opening degree of the servo valve 505A is controlled to increase the oil pressure applied to the piston 27A, the piston 27A moves forward. As a result, the screw 23A connected to the piston 27A moves forward, and the molten material is injected from the nozzle toward the mold clamping apparatus by the forward moving screw 23A (see FIG. 3). The injection apparatus 2A is operated as described above (S108A).

Similarly, the "second command signal" output from the second command signal output unit 800B of the oil hydraulic controller 300B is input to the servo amplifier 400B. The servo amplifier 400B then supplies the output for achieving the opening degree of the target value indicated by the "second command signal" to the servo valve 505B (S107B). As a result, the opening degree of the servo valve 505B changes based on the power output from the servo amplifier 400B.

Then, the flow rate of the flowing oil is adjusted as a result of the change in the opening degree of the servo valve 505B, and the oil pressure for moving the piston 27B is controlled.

That is, for example, when the opening degree of the servo valve 505B is controlled to increase the oil pressure applied to the piston 27B, the piston 27B moves forward. As a result, the screw 23B connected to the piston 27B moves forward, and the molten material is injected from the nozzle toward the mold clamping apparatus by the forward moving screw 23B (see FIG. 3). The injection apparatus 2B is operated as described above (S108B).

<<Features in First Embodied Mode>>

Next, features of the first embodied mode will be described.

As shown in FIG. 5, for example, the features of the first embodied mode lie in that the output timing of the "first command signal" from the oil hydraulic controller 300A to the servo amplifier 400A and the output timing of the "second command signal" from the oil hydraulic controller 300B to the servo amplifier 400B are matched with each other since the synchronization signal generator 600 for generating the "synchronization signal" based on the "synchronization signal generation command" output from the central controller 200 is provided and since the "synchronization signal" is output from the synchronization signal generator 600 to the oil hydraulic controller 300A and the oil hydraulic controller 300B. In other words, the features of the first embodied mode lie in that the output timing of the "first command signal" from the oil hydraulic controller 300A to the servo amplifier 400A and the output timing of the "second command signal" from the oil hydraulic controller 300B to the servo amplifier 400B are synchronized with each other by use of the "synchronization signal" generated by the synchronization signal generator 600.

Specifically, the oil hydraulic controller 300A simply waits when receiving the input of the "first injection start signal" output from the central controller 200, but outputs the "first command signal" to the servo amplifier 400A for the first time after elapse of the predetermined time X from the additional input of the "synchronization signal" generated by the synchronization signal generator 600. Similarly, the oil hydraulic controller 300B simply waits when receiving the input of the "second injection start signal" output from the central controller 200, but outputs the "second command signal" to the servo amplifier 400B for the first time after elapse of the predetermined time X from the additional input of the "synchronization signal" generated by the synchronization signal generator 600.

As a result, according to the first embodied mode, the "unintentional shift" between the first injection start timing in the injection apparatus 2A and the second injection start timing in the injection apparatus 2B can be suppressed. As a result, according to the first embodied mode, the unbalanced material filling state in the closed space of the mold clamping apparatus due to the "unintentional shift" between the first injection start timing in the injection apparatus 2A and the second injection start timing in the injection apparatus 2B can be suppressed.

For example, in FIG. 4 describing "<Room for Improvement>", about 5 ms exists as the difference in time between the "injection start signal" input to the oil hydraulic controller 300A and the "injection start signal" input to the oil hydraulic controller 300B. As a result, when the injection time is short to be a few tens of ms as described in the "twin injection molding machine 100" using magnesium alloy for the material, the first injection start timing in the injection apparatus 2A and the second injection start timing in the injection apparatus 2B are unintentionally shifted from each other by about 5 ms. As a result, the unbalanced material filling state in the closed space of the mold clamping apparatus is caused.

On the other hand, according to the first embodied mode shown in FIG. 5, since the "synchronization signal" generated by the synchronization signal generator 600 is used, the output timing of the "first command signal" from the oil hydraulic controller 300A to the servo amplifier 400A and the output timing of the "second command signal" from the oil hydraulic controller 300B to the servo amplifier 400B are synchronized with each other.

Therefore, the difference in time between the "first command signal" output from the oil hydraulic controller 300A and the "second command signal" output from the oil hydraulic controller 300B can be suppressed to shifting (variation) of 200 µs or shorter. This means that the shift between the first injection start timing in the injection apparatus 2A and the second injection start timing in the injection apparatus 2B can be made small to about 200 µs. As a result, according to the first embodied mode, even if the injection time is short to be a few tens of ms as described in the "twin injection molding machine 100" using magnesium alloy for the material, the unbalanced material filling state in the closed space of the mold clamping apparatus can be suppressed.

In the first embodied mode, the reason why the output timing of the "first command signal" from the oil hydraulic controller 300A to the servo amplifier 400A and the output timing of the "second command signal" from the oil hydraulic controller 300B to the servo amplifier 400B can be matched with each other by the output of the "synchronization signal" from the synchronization signal generator 600 to each of the oil hydraulic controller 300A and the oil hydraulic controller 300B is largely the following causes.

(First Cause)

The oil hydraulic controller 300A waits even when receiving the input of the "first injection start signal" output from the central controller 200. Similarly, the oil hydraulic controller 300B waits even when receiving the input of the "second injection start signal" output from the central controller 200.

For example, each of the "first injection start signal" and the "second injection start signal" is output from the central controller 200 to the oil hydraulic controller 300A and the oil hydraulic controller 300B through communication, respectively. As a result, the first distance between the central controller 200 and the oil hydraulic controller 300A and the second distance between the central controller 200 and the oil hydraulic controller 300B are different from each other. Thus, although the "unintentional shift" occurs between the arrival timing of the "first injection start signal" at the oil hydraulic controller 300A and the arrival timing of the "second injection start signal" at the oil hydraulic controller 300B, the oil hydraulic controller 300A of the first embodied mode is configured such that the "first command signal" is output to the servo amplifier 400A for the first time after elapse of the predetermined time X from not only the input of the "first injection start signal" but also the input of the "synchronization signal" generated by the synchronization signal generator 600. Similarly, the oil hydraulic controller 300B of the first embodied mode is also configured such that the "second command signal" is output to the servo amplifier 400B for the first time after elapse of the predetermined time X from not only the input of the "second injection start signal" but also the input of the "synchronization signal" generated by the synchronization signal generator 600.

Therefore, in the first embodied mode, the "unintentional shift" between the arrival timing of the "first injection start signal" at the oil hydraulic controller 300A and the arrival timing of the "second injection start signal" at the oil hydraulic controller 300B due to the communication is not clearly caused, and, as a result, the output timing of the "first command signal" and the output timing of the "second command signal" can be matched with each other.

(Second Cause)

The synchronization signal generator 600 is configured by one synchronization signal output substrate.

For example, the "synchronization signal" is generated based on the "synchronization signal generation command" output from the central controller 200 through communication. At this time, since the synchronization signal generator 600 is configured by one synchronization signal output substrate, the "synchronization signal generation command" output from the central controller 200 has no room of occurrence of the "unintentional shift" based on the communication, and it is unnecessary in the "synchronization signal" to consider the "unintentional shift" caused by the communication. Furthermore, since the "synchronization signal" output from the synchronization signal generator 600 is a logic signal depending on not the communication but potential change, a shift between the input timing of the "synchronization signal" to the oil hydraulic controller 300A and the input timing of the "synchronization signal" to the oil hydraulic controller 300B hardly occurs.

Therefore, because of, of course, the adoption of the configuration using the "synchronization signal", and besides, because of the synergistic factor of the first cause and the second cause described above, the first embodied mode has the large technical significance for matching the output timing of the "first command signal" from the oil hydraulic controller 300A to the servo amplifier 400A and the output timing of the "second command signal" from the oil hydraulic controller 300B to the servo amplifier 400B.

<<Technical Significance of Providing Predetermined Time Measurement Unit>>

The first predetermined time measurement unit 700A and the second predetermined time measurement unit 700B are collectively referred to as predetermined time measurement unit. Hereinafter, the technical significance of providing the predetermined time measurement unit will be described.

In the first embodied mode described above, the output timing of the "first command signal" from the oil hydraulic controller 300A to the servo amplifier 400A and the output timing of the "second command signal" from the oil hydraulic controller 300B to the servo amplifier 400B are synchronized with each other by using the "synchronization signal" generated by the synchronization signal generator 600. According to the first embodied mode, the "unintentional shift" between the first injection start timing in the injection apparatus 2A and the second injection start timing in the second injection apparatus can be basically suppressed, and thus a remarkable effect achieving the suppression of the unbalanced material filling state in the closed space of the mold clamping apparatus is provided.

Therefore, it is also conceivable that it is not always to arrange the predetermined time measurement unit if the "synchronization signal" is used. In other words, for example, the oil hydraulic controller 300A outputs the "first command signal" to the servo amplifier 400A for the first time after elapse of the predetermined time X from not only the input of the "first injection start signal" but also the input of the "synchronization signal" generated by the synchronization signal generator 600, but when considering merely taking synchronization, and the predetermined time X is allowed to be "zero" only in a viewpoint of achievement of simple synchronization, and thus it is also conceivable that it is unnecessary to arrange the predetermined time measurement unit.

However, for example, it is also conceivable that machine difference in the mechanical injecting operation may occur between the injection apparatus 2A and the injection apparatus 2B, and it is also conceivable that load difference may occur depending on the state of the material in the cylinder 22A and the cylinder 22B. As a result, even if the "first command signal" output from the oil hydraulic controller 300A and the "second command signal" output from the oil hydraulic controller 300B are synchronized, the "unintentional shift" between the first injection start timing in the injection apparatus 2A and the injection start timing in the second injection apparatus possibly occur. Thus, even if the first embodied mode is adopted, there is a possibility of failing to completely suppress the unbalanced filling material state in the closed space of the mold clamping apparatus.

Thus, it is conceivable that the unbalancing of the material injected from each of the injection apparatus 2A and the injection apparatus 2B can be suppressed by the intentional shift by a predetermined time between the output timing of the "first command signal" from the oil hydraulic controller 300A and the output timing of the "second command signal" from the oil hydraulic controller 300B so as to absorb the "unintentional shift" caused by the machine difference and the load difference. With regards to this, the predetermined time measurement unit described above has an important role for achieving a configuration of the intentional shift by the predetermined time between the output timing of the "first command signal" from the oil hydraulic controller 300A and the output timing of the "second command signal" from the oil hydraulic controller 300B. That is, the configuration of the intentional shift between the output timing of the "first command signal" from the oil hydraulic controller 300A and the output timing of the "second command signal" from the oil hydraulic controller 300B can be easily achieved by, for example, setting different values for the first predetermined time measured by the first predetermined time measurement unit 700A and the second predetermined time measured by the second predetermined time measurement unit 700B.

Thus, it can be said that a large technical significance of the arrangement of the predetermined time measurement unit lies in easily achieving the configuration of the intentional shift by the predetermined time between the output timing of the "first command signal" from the oil hydraulic controller 300A and the output timing of the "second command signal" from the oil hydraulic controller 300B so as to absorb the "unintentional shift" caused by the machine difference and the load difference. Hereinafter, such a second embodied mode will be described.

<Second Embodied Mode (Intentional Time Difference)>
<<Configuration of Distributed Control System>>

A distributed control system in a second embodied mode basically has a configuration similar to the distributed control system in the first embodied mode described above. However, in the second embodied mode, the first predetermined time measured by the first predetermined time measurement unit 700A and the second predetermined time measured by the second predetermined time measurement unit 700B are set to different values. For example, the first predetermined time measured by the first predetermined time measurement unit 700A is set to the predetermined time X, and the second predetermined time measured by the second predetermined time measurement unit 700B is set to the predetermined time Y.

<<Operation of Distributed Control System>>

Figure 7:
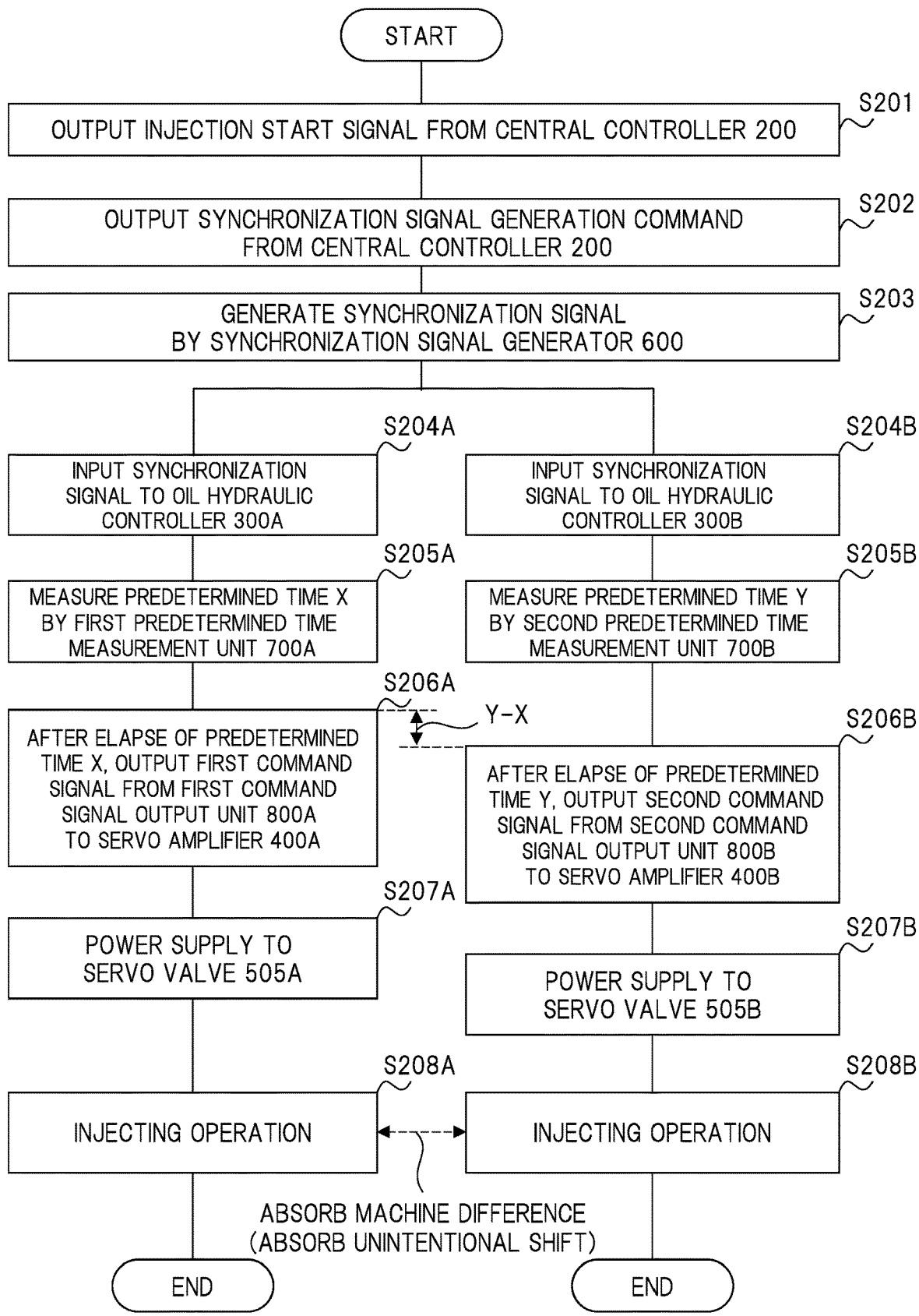
FIG. 7 is a flowchart describing the operation of a second embodied mode.

FIG. 7 is a flowchart describing the operation of the distributed control system in the second embodied mode, and the operation of the distributed control system will be described with reference to FIGS. 5 and 7.

First, the central controller 200 outputs the "first injection start signal" to the oil hydraulic controller 300A of the injection apparatus 2A, and outputs the "second injection start signal" to the oil hydraulic controller 300B of the injection apparatus 2B through communication (S201). The "first injection start signal" output from the central controller 200 is input to the oil hydraulic controller 300A of the injection apparatus 2A, and the "second injection start signal" output from the central controller 200 is input to the oil hydraulic controller 300B of the injection apparatus 2B.

Here, even if the "first injection start signal" is input, the oil hydraulic controller 300A waits without immediately outputting the "first command signal" to the servo amplifier 400A. Similarly, even if the "second injections start signal" is input, the oil hydraulic controller 300B waits without immediately outputting the "second command signal" to the servo amplifier 400B.

Furthermore, the central controller 200 outputs the "synchronization signal generation command" to the synchronization signal generator 600 through communication (S202). The synchronization signal generator 600 then generates the "synchronization signal" based on the "synchronization signal generation command" output from the central controller 200 (S203). Then, the "synchronization signal" generated by the synchronization signal generator 600 is input to each of the oil hydraulic controller 300A and the oil hydraulic controller 300B (S204A, S204B).

When the "synchronization signal" is input to the oil hydraulic controller 300A, the first predetermined time measurement unit 700A starts to measure the preset predetermined time X (S205A). After the measurement of the predetermined time X by the first predetermined time measurement unit 700A is terminated, the first command signal output unit 800A outputs the "first command signal" to the servo amplifier 400A (S206A).

Similarly, when the "synchronization signal" is input to the oil hydraulic controller 300B, the second predetermined time measurement unit 700B starts to measure the preset predetermined time Y (S205B). After the measurement of the predetermined time Y by the second predetermined time measurement unit 700B is terminated, the second command signal output unit 800B outputs the "second command signal" to the servo amplifier 400A (S206B).

Therefore, the oil hydraulic controller 300A merely waits even if the "first injection start signal" output from the central controller 200 is input, and does not output the "first command signal" to the servo amplifier 400A but outputs the "first command signal" to the servo amplifier 400A for the first time after elapse of the predetermined time X from the additional input of the "synchronization signal" generated by the synchronization signal generator 600.

On the other hand, the oil hydraulic controller 300B merely waits even if the "second injection start signal" output from the central controller 200 is input, and does not output the "second command signal" to the servo amplifier 400B but outputs the "second command signal" to the servo amplifier 400B for the first time after elapse of the predetermined time Y from the additional input of the "synchronization signal" generated by the synchronization signal generator 600.

As a result, in the second embodied mode, the output timing of the "first command signal" to the servo amplifier 400A and the output timing of the "second command signal" to the servo amplifier 400B are intentionally shifted by time difference (Y−X). Thus, the injecting operation is started in a state in which the injection apparatus 2A and the injection apparatus 2B are shifted from each other by the time difference (Y−X).

Next, the "first command signal" output from the oil hydraulic controller 300A is input to the servo amplifier 400A. To the servo valve 505A, the servo amplifier 400A then supplies output for achieving the opening degree of the target value indicated by the "first command signal" (S207A). As a result, the opening degree of the servo valve 505A changes based on the power output from the servo amplifier 400A.

Then, the flow rate of the flowing oil is adjusted as a result of the change in the opening degree of the servo valve 505A, and the oil pressure for moving the piston 27A is controlled. That is, for example, when the opening degree of the servo valve 505A is controlled to increase the oil pressure applied to the piston 27A, the piston 27A moves forward. As a result, the screw 23A connected to the piston 27A moves forward, and the molten material is injected from the nozzle to the mold clamping apparatus by the forward moving screw 23A (see FIG. 3). The injection apparatus 2A operates as described above (S208A).

On the other hand, the "second command signal" output from the oil hydraulic controller 300B is input to the servo amplifier 400B. To the servo valve 505B, the servo amplifier 400B then supplies output for achieving the opening degree of the target value indicated by the "second command signal" (S207B). As a result, the opening degree of the servo valve 505B changes based on the power output from the servo amplifier 400B.

Then, the flow rate of the flowing oil is adjusted as a result of the change in the opening degree of the servo valve 505B, and the oil pressure for moving the piston 27B is controlled. That is, for example, when the opening degree of the servo valve 505B is controlled to increase the oil pressure applied to the piston 27B, the piston 27B moves forward. As a result, the screw 23B connected to the piston 27B moves forward, and the molten material is injected from the nozzle to the mold clamping apparatus by the forward moving screw 23B (see FIG. 3). The injection apparatus 2B operates as described above (S208B).

Here, if it is assumed that the "unintentional shift" (by time difference Z) caused by the machine difference and the load difference between the injecting operation of the injection apparatus 2A indicated in "S208A" and the injecting operation of the injection apparatus 2B indicated in "S208B", the injection start timing in the injection apparatus 2A and the injection start timing in the injection apparatus 2B in the second embodied mode are intentionally shifted from each other by the time difference (Y−X). Thus, according to the second embodied mode, the time difference between the injection start timing in the injection apparatus 2A and the injection start timing in the injection apparatus 2B can be set as the "time difference Z−time difference (Y−X)" smaller than the "unintentional shift" (by time difference Z) caused by the machine difference and the load difference. In particular, if the intentional time difference (Y−X) between the output timing of the "first command signal" to the servo amplifier 400A and the output timing of the "second command signal" to the servo amplifier 400B can be made substantially equal to the "unintentional shift" (by time difference Z) caused by the machine difference and the load difference, the "unintentional shift" (by time difference Z) can be canceled out by the time difference (Y−X). As a result, the time difference between the injection start timing in the injection apparatus 2A and the injection start timing in the injection apparatus 2B can be brought as close to zero as possible.

<<Features of Second Embodied Mode>>

Next, the features of the second embodied mode will be described.

The features of the second embodied mode lie in making the intentional time difference between the output timing of the "first command signal" to the servo amplifier 400A and the output timing of the "second command signal" to the servo amplifier 400B so as to absorb the "unintentional shift" caused by the machine difference and the load difference. Thus, in the second embodied mode, the unbalancing of the material injected from each of the injection apparatus 2A and the injection apparatus 2B can be suppressed since the output timing of the "first command signal" in the injection apparatus 2A and the output timing of the "second command signal" in the injection apparatus 2B are intentionally shifted from each other by a predetermined time so as to absorb (desirably cancel out) the "unintentional shift" caused by the machine difference and the load difference.

For example, the predetermined time difference between the output timing of the "first command signal" to the servo amplifier 400A and the output timing of the "second command signal" to the servo amplifier 400B can be set as described below. That is, the predetermined time X measured by the first predetermined time measurement unit 700A and the predetermined time Y measured by the second predetermined time measurement unit 700B can be set as, for example, described below.

Specifically, if the "twin injection molding machine" is previously operated to acquire data related to the "unintentional shift" caused by the machine difference and the load difference, the "unintentional shift" is recognized based on the data, and the time difference (Y−X) between the predetermined time X measured by the first predetermined time measurement unit 700A and the predetermined time Y measured by the second predetermined time measurement unit 700B can be set so as to cancel out the recognized "unintentional shift".

Furthermore, if it is assumed that the material in the cylinder of each of the injection apparatus 2A and the injection apparatus 2B is the same as each other, the injected material amount is highly possibly the same when the remaining amount is the same as each other. In consideration of this point, in the "twin injection molding machine", the predetermined time difference can be automatically set as described below. For example, the remaining amounts of material after injection and pressure maintaining in the injection apparatus 2A and the injection apparatus 2B are measured and compared from each other. Then, the correction amount corresponding to the difference in the remaining amount obtained from the comparison result is calculated, and the calculated correction amount is set as the time difference (Y−X) between the predetermined time X measured by the first predetermined time measurement unit 700A and the predetermined time Y measured by the second predetermined time measurement unit 700B. As a result, the time difference between the output timing of the "first command signal" to the servo amplifier 400A and the output timing of the "second command signal" to the servo amplifier 400B can be automatically set so that the remaining amounts of material existing in the injection apparatus 2A and the injection apparatus 2B are the same as each other.

Modification Example

Note that in the first embodied mode, the configuration example in which the "injection start signal" input to the oil hydraulic controller 300A and the "injection start signal" input to the oil hydraulic controller 300B are synchronized with each other has been described. However, the technical idea of the embodiment is not limited to this example. For example, the "first command signal" input to the servo amplifier 400A and the "second command signal" input to the servo amplifier 400B may be synchronized with each other. In this case, signals can be synchronized with each other on the downstream side of the distributed control system closer to the servo valve 505A and the servo valve 505B, and thus the time shift involved in the downstream process after the synchronization can be reduced. This case results in the advantage that is the further reduction of the shift between the first injection start timing in the injection apparatus 2A and the second injection start timing in the injection apparatus 2B.

Furthermore, the first embodied mode has been described on the premise of the configuration with the arrangement of the synchronization signal generator 600 in the different synchronization signal output substrate from the "first control substrate" (oil hydraulic controller 300A) and the "second control substrate" (oil hydraulic controller 300B). However, the technical idea of the embodiment is not limited to this case. The synchronization signal generator 600 may be arranged on the "first control substrate" or the "second control substrate", or arranged on both the "first control substrate" and the "second control substate".

In the foregoing, the invention made by the inventors of the present application has been concretely described on the basis of the embodiments. However, it is needless to say that the present invention is not limited to the foregoing embodiments, and various modifications can be made within the scope of the present invention.

What is claimed is:

1. A method of controlling an injection molding machine comprising a step of
adjusting a time difference between a first injection start timing of a first material injected from a first injection apparatus performing an injecting operation of the first material, based on a first injection start signal for the first injection apparatus output from a central controller centrally controlling an injection molding operation, and a second injection start timing of a second material injected from a second injection apparatus performing an injecting operation of the second material based on a second injection start signal for the second injection apparatus output from the central controller,
the method further comprising steps of:
(a) generating a synchronization signal by a synchronization signal generator, based on a command from the central controller;
(b) controlling the first injection apparatus; and
(c) controlling the second injection apparatus,
wherein the step (b) includes steps of:
(b1) inputting the first injection start signal to a first controller;
(b2) inputting the synchronization signal to the first controller;

(b3) measuring elapse of a first predetermined time from input of the synchronization signal;

(b4) outputting a first command signal from the first controller to a first servo amplifier after the elapse of the first predetermined time measured in the step (b3); and (b5) controlling an opening degree of a first servo valve by the first servo amplifier, and the step (c) includes steps of:

(c1) inputting the second injection start signal to a second controller;

(c2) inputting the synchronization signal to the second controller;

(c3) measuring elapse of a second predetermined time from input of the synchronization signal;

(c4) outputting a second command signal from the second controller to a second servo amplifier after the elapse of the second predetermined time measured in the step (c3); and (c5) controlling an opening degree of a second servo valve by the second servo amplifier.

2. The method of controlling the injection molding machine according to claim 1, wherein the first predetermined time and the second predetermined time are the same as each other.

3. The method of controlling the injection molding machine according to claim 1, wherein the first predetermined time and the second predetermined time are different from each other.

* * * * *